United States Patent
Paetow et al.

(10) Patent No.: US 9,168,403 B2
(45) Date of Patent: Oct. 27, 2015

(54) BRACKET FOR A FIRESTOP COLLAR AND USE OF THIS BRACKET

(71) Applicants: Mario Paetow, Igling (DE); Rudolf Semler, Prittriching (DE)

(72) Inventors: Mario Paetow, Igling (DE); Rudolf Semler, Prittriching (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/623,484

(22) Filed: Sep. 20, 2012

(65) Prior Publication Data
US 2013/0086857 A1 Apr. 11, 2013

(30) Foreign Application Priority Data
Oct. 5, 2011 (DE) .......... 10 2011 084 056

(51) Int. Cl.
| E04B 1/94 | (2006.01) |
| A62C 2/06 | (2006.01) |
| F16L 5/04 | (2006.01) |
| H02G 3/04 | (2006.01) |

(52) U.S. Cl.
CPC . A62C 2/065 (2013.01); F16L 5/04 (2013.01); H02G 3/0412 (2013.01)

(58) Field of Classification Search
CPC .............. E04B 1/94; E04B 1/948; F16L 5/04; F16L 57/04
USPC ............................................................. 52/232
See application file for complete search history.

(56) References Cited

U.S. PATENT DOCUMENTS

| 5,347,767 A * | 9/1994 | Roth .................................. 52/1 |
| 5,452,551 A * | 9/1995 | Charland et al. ................ 52/232 |
| 2004/0149390 A1* | 8/2004 | Monden et al. ............... 156/391 |

FOREIGN PATENT DOCUMENTS

| DE | 198 52 120 | 3/2000 |
| DE | 201 10 973 | 8/2001 |
| DE | 102 17 174 | 10/2003 |
| DE | 103 05 903 | 8/2004 |
| DE | 20 2006 004 488 U1 | 5/2006 |
| DE | 20 2006 019 593 U1 | 4/2007 |
| DE | 10 2008 031 018 | 7/2009 |
| DE | 10 2008 059 564 | 6/2010 |
| GB | 2 388 174 | 10/2003 |

* cited by examiner

*Primary Examiner* — Patrick Maestri
(74) *Attorney, Agent, or Firm* — Davidson, Davidson & Kappel, LLC

(57) ABSTRACT

Device for a firestop collar, including an anchoring element and an expansion element The anchoring element serves to anchor the device to a substrate, and the expansion element is intended to interact with the firestop collar. The expansion element is made of intumescent material and is arranged between the anchoring element and the firestop collar in such a way that it is in contact with the firestop collar.

11 Claims, 3 Drawing Sheets

BRACKET FOR A FIRESTOP COLLAR AND USE OF THIS BRACKET

This claims the benefit of German Patent Application DE 10 2011 084 056.7, filed Oct. 5, 2011 and hereby incorporated by reference herein.

The invention relates to a bracket for a firestop collar as well as to the use of this bracket as fastening material for a firestop collar.

BACKGROUND

The firestop collar arranged around pipes or cables comprises intumescent material that expands upon exposure to heat, closing off the penetration as tightly as possible, so as to prevent propagation of the fire. Depending on the diameter of the penetration, the firestop collar can be arranged at an outer end of the penetration, for example, on the wall or floor/ceiling, or else directly in the penetration. When the firestop collar is arranged at the entrance to the penetration (wall mounting), it is normally fastened to the wall or floor/ceiling by means of brackets. Such firestop collars are described, for example, in German applications DE 10 2008 031 018 A1, DE 102 17 174 A1 and DE 198 52 120 A1. If the firestop collar is arranged in the penetration in such a way that only a small part of the firestop collar projects beyond the penetration, no additional bracket is needed as is the case with wall mounting. This is also referred to as firestop bandages or firestop strips. Such firestop collars are described, for instance, in German utility model DE 201 10 973 U1, German patent application DE 103 05 903 A1 or German patent application DE 10 2008 059 564 A1. The firestop collars, which are mounted so as to have an overhang, that is to say, which are wrapped around the pipe so as to extend partially beyond the penetration, are employed with a sufficient overhang, especially when it comes to thin-walled plastic pipes, so that, in case of fire, the intumescent material of the firestop collar can be heated up early enough to the temperatures needed for the expansion. When the firestop collar is completely integrated into the penetration, these temperatures are often only reached at too late a point in time, so that the plastic pipe collapses before the firestop collar starts to expand.

As set forth in the invention, the term "firestop collar" comprises all types of wrappings that are wound around pipes or cables and that have firestop properties, especially firestop fabric collars, that is to say, strips of intumescent material that are wrapped with a fabric strip, firestop bandages and firestop strips which are such that they are made of a material or applied onto a carrier that is so flexible that it can be pushed in a specific direction by the intumescence pressure of an expandable material. This list is provided by way of an example and should not be constructed in any limiting manner.

A firestop collar in the form of a firestop strip having an overhang is shown by way of an example in FIG. 1. A wall 2 has a penetration 3 through which a pipe 1 runs that extends along the longitudinal axis A. A firestop collar 4 which is, for instance, a fabric strip comprising intumescent material 5 surrounds the pipe 1 in the penetration 3 in the circumferential direction with an overhang, so that it comes to rest partially between the pipe 1 and the penetration 3. The remaining opening 7, in other words, the gap left between the firestop collar 4 and the penetration 3, can be filled with mortar or gypsum 6, which optionally can have firestop properties. This affixes the firestop collar 4 in the penetration 3.

These prior-art arrangements, however, entail the problem that some of the intumescent material 5 spreads in the axial direction (that is to say, essentially parallel to the longitudinal axis A of the pipe 1) and is squeezed out at the opening of the penetration 3 on the side of the wall. Moreover, the intumescence in the area of the overhang is not oriented and the intumescent material 5 spreads in all directions. As a result, intumescent material is lost and is then not available to close off the penetration 3. A correspondingly large quantity of intumescent material 5 is normally employed in order to remedy this problem.

SUMMARY OF THE INVENTION

It is an object of the present invention to provide a device for a firestop collar that allows the firestop collar to be used efficiently.

The present invention provides a device for a firestop collar, comprising an anchoring element and an expansion element. The anchoring element is provided in order to anchor the device to a substrate. The expansion element is intended to interact with a firestop collar. The expansion element contains an intumescent material. The device according to the invention is based on the fundamental notion of actively moving a firestop collar in case of fire in the direction of a penetration present in the substrate. The device according to the invention can be used for any firestop collars that are soft and flexible enough to be pushed by the intumescence pressure of the expansion element towards the penetration that is to be closed off. The systematic deformation of the firestop collar allows its intumescent material to be directed towards the penetration. Consequently, the intumescent material is utilized effectively and a smaller amount can be used in the firestop collar, which translates into cost savings.

According to one embodiment, the anchoring element has at least a first leg and a second leg. The first leg can be provided to fasten the anchoring element to the substrate, and the expansion element can be arranged on the second leg of the anchoring element.

Preferably, the anchoring element has legs that are in an L-shaped arrangement.

According to one embodiment of the invention, the one (second) leg of the device is a sheet metal tab that can also be provided with at least one fastening means, such as a hook. This hook is provided for the purpose of interacting with the expansion element in order to secure it. As an alternative, a mandrel, a claw or another means having an equivalent function can also be employed in order to secure the expansion element.

According to a preferred embodiment of the invention, the second leg is provided with an additional, third leg. This additional, third leg serves to prevent the intumescent material from being squeezed out upwards, in other words, away from the penetration, and it is advantageously dimensioned in such a way that it essentially matches the cross section of the expansion element. The device must not hinder the intumescence of the expansion element in the direction of the firestop collar since otherwise, it would no longer be ensured that the expanded expansion element pushes the firestop collar in the direction of the penetration.

Preferably, the anchoring element has two legs that are in an L-shaped arrangement.

With this embodiment, the firestop collar is not secured directly by the device. The device can be mounted on the wall in such a way that the firestop collar is clamped between the pipe and the device, to put it more precisely, between the pipe and the expansion element. Moreover, the firestop collar can be selected so as to be so thick that it can be clamped in the penetration and consequently does not need to be additionally secured. As an alternative, the firestop collar can be affixed and secured by a hardening compound such as firestop foam, mortar or gypsum.

In another embodiment of the device described above, the third leg can also be configured in such a manner that it covers the expansion element as well as the firestop collar at the top, thus preventing the expansion element and the firestop collar from spreading away from the penetration, especially in the axial direction.

According to another embodiment, the expansion element is arranged in a shell that prevents the intumescent material of the expansion element from being squeezed out at the sides. In this manner, the intumescence pressure brought to bear by the expansion element can be effectively directed towards the firestop collar. In this context, the second leg can be provided with side tabs that extend in the direction of the expansion element. This makes it possible to manufacture the shell particularly inexpensively.

Preferably, the device according to the invention has a third leg, which can also be configured as a tab, as well as side tabs in order to form a shell which, together with the wall to which the device is affixed, surrounds the expansion element from five sides. Consequently, the intumescence pressure brought to bear by the expansion element can be directed especially effectively and virtually without losses towards the firestop collar.

According to another aspect of the invention, the device according to one or more of the above-mentioned aspects of the invention can be employed as an additional element for a firestop collar. The effects and advantages already mentioned in conjunction with the bracket apply in an identical or similar manner to its use as an additional element for a firestop collar.

BRIEF DESCRIPTION OF THE DRAWINGS

Additional features and advantages of the invention can be gleaned from the description below of advantageous embodiments making reference to the accompanying drawings. The following is shown.

DETAILED DESCRIPTION

Figure 1:
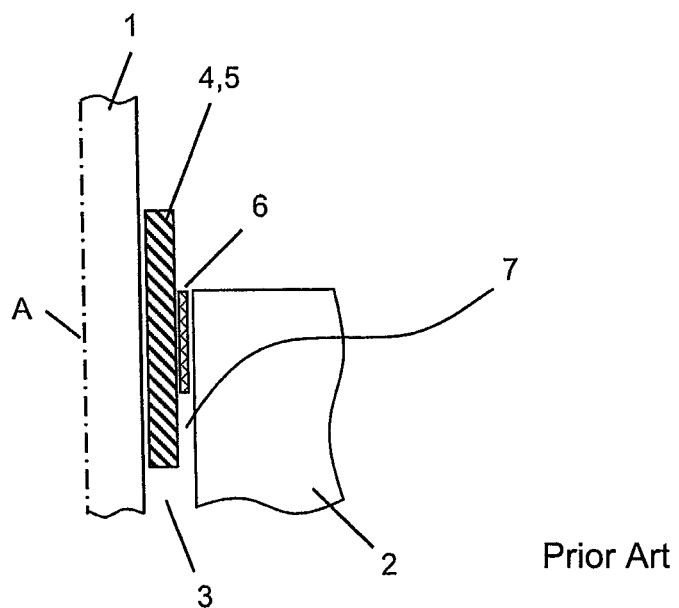
FIG. 1: a schematic sectional view of a bracket for a firestop collar known from the state of the art.
Figure 2:
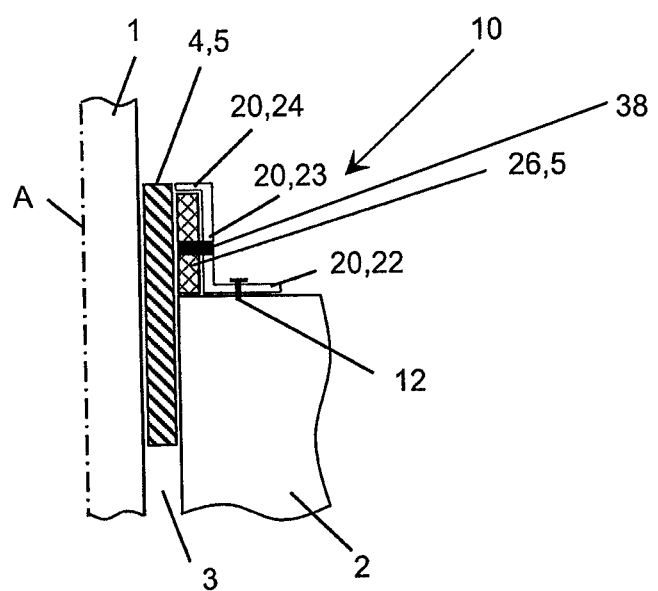
FIG. 2: a schematic sectional view of a device according to a first embodiment.

FIG. 2 shows a schematic sectional view of a device 10 according to a first embodiment. The device 10 comprises an anchoring element 20 that consists of a first leg 22, a second leg 23 and a third leg 24. The legs 22, 23, 24 are in an L-shaped arrangement with respect to each other. The first leg 22 is fastened to a wall 2 by means of a screw 12 as the fastening element. An expansion element 26 is joined to the anchoring element 20 in the L-shaped shell formed by the second leg 23 and the third leg 24. Preferably, the second leg 23 is a sheet metal tab that can also comprise fastening means (not shown in the figure) such as a hook or mandrels or another means having an identical function that secures the expansion element 26. The firestop collar 4, which can be secured, for instance, by means of encapsulation with foam, plaster or mortar, has the function of closing off the penetration 3 of the wall 2 in case of fire.

The expansion element 26, like the firestop collar 4, consists of intumescent material 5. Intumescent material having a conventional composition, for instance, active substances such as acidifiers, carbon sources, foaming agents and physically expandable compounds like expandable graphite, which are bonded in a matrix, especially a polymer matrix, can be used for the firestop collar 4 as well as for the expansion element 26. The expansion element 26 is preferably a flat strip of intumescent material 5, whose first flat side is in contact with the second leg 23 of the anchoring element 20, and whose opposite flat side is in contact with the firestop collar 4.

In case of fire, it is not only the intumescent material 5 of the firestop collar 4 that expands but also the intumescent material 5 of the expansion element 26. The expansion of the expansion element 26 exerts intumescence pressure onto the firestop collar 4, as a result of which the latter is pushed relative to the anchoring element 20 in the direction of the opening of the penetration. The intumescent material 5 of the firestop collar thus expands not only radially but also axially inwards, that is to say, parallel to the longitudinal axis A of the pipe 1 that might have been destroyed by the fire. The firestop collar 4 is, for example, a fabric collar. However, it is likewise possible to employ other firestop collars 4 such as, for instance, a firestop strip or a firestop bandage, which are soft and flexible enough to be deformed by the intumescence pressure caused by the expansion element 26.

In an alternative embodiment, the second leg 23 of the anchoring element 20 can be provided—on its flat side that is in contact with the flat side of the expansion element 26 situated opposite from the firestop collar—with optional fastening means 38, shown schematically, such as, for instance, mandrels or hooks and the like, which secure the expansion element 26. The fastening means can also be arranged on the side edge of the second leg 24 and can be configured, for example, in the form of hooks that are facing the expansion element 26.

Figure 3:
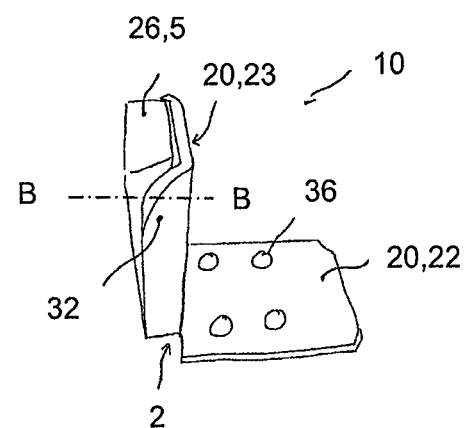
FIG. 3: a perspective view of a device according to a second embodiment.

In order to be able to build up sufficient intumescence pressure, it is advantageous if the device 10, according to another embodiment, has a shell formed by the anchoring element 20, with the expansion element 26 being arranged in the shell. FIG. 3 shows such a device 10 in a simplified, perspective view. For purposes of fastening the device to a wall or floor/ceiling, the first leg 22 of the anchoring element 20 is provided with preferably stamped fastening openings 36. The device 10 can preferably be stamped out of a strip of sheet metal and bent into the desired shape.

Figure 4:
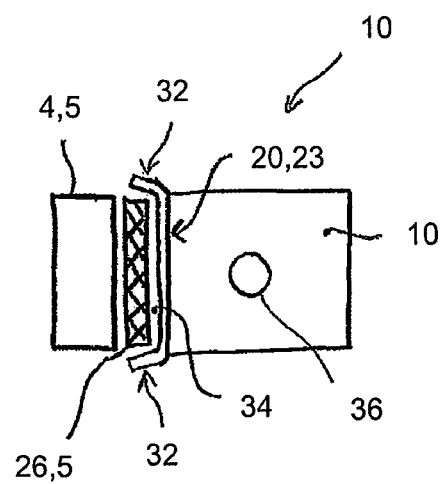
FIG. 4: a schematic top view of this device in the sectional direction B-B

FIG. 4 shows such a device 10 in a schematic top view along the sectional edge B-B from FIG. 3. The second leg 23 of the anchoring element 20 is provided with side tabs 32 that extend in the direction of the expansion element 26. The side tabs 32 can prevent the expansion element 26 from being squeezed out at the sides, so that a sufficiently high intumescence pressure can build up in the shell 34.

Figure 5:
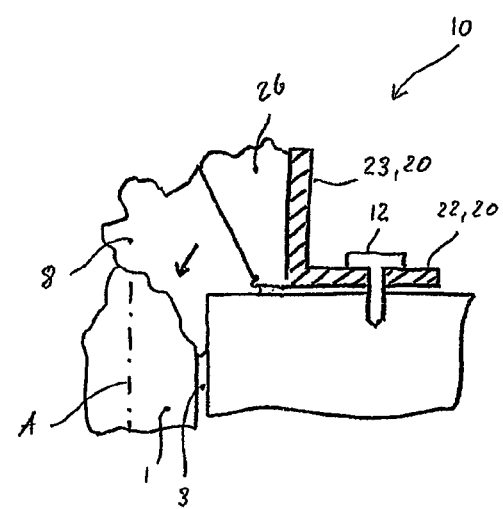
FIG. 5: a schematic sectional view of a device in an expanded state, according to one embodiment.

FIG. 5 shows another schematic sectional view of a device 10 in which the intumescent material 5 of the expansion element 26 has expanded due to the action of the fire, as a result of which the expansion element 26 was activated and the firestop collar 4 was pushed out of its original position. The intumescent material 5 of the firestop collar 4 has expanded in the direction of the penetration 3 (as indicated by an arrow) and protects the already destroyed pipe 1 against the fire.

LIST OF REFERENCE NUMERALS 1 pipe
2 wall 3 penetration
4 firestop collar
5 intumescent material
6 gypsum, mortar
7 annular gap, remaining opening
10 device
12 screw
20 anchoring element
22 first leg
23 second leg
24 third leg
26 expansion element
32 side tabs
34 shell
36 fastening openings
38 fastening means
A longitudinal axis
B-B cross sectional axis

What is claimed is:

1. A device for a firestop collar, the device comprising:
an anchor for anchoring the device to a substrate; and
an expander intended to interact with the firestop collar, the expander being an intumescent material, the anchor having a first leg and a second leg, the first leg provided to fasten the anchor to the substrate, wherein the second leg has two side tabs extending in an oblique direction from the later edges in a direction of the expander to define a shell, the expander arranged on the second leg to fit within the shell.

2. The device as recited in claim 1 wherein the anchor has first and second legs are in an L-shaped arrangement.

3. The device as recited in claim 1 wherein the second leg is provided with at least one fastener for fastening the expander.

4. A method for using the device as recited in claim 1 comprising: providing the device as an additional element for a firestop collar.

5. A method for using the device as recited in claim 1 comprising: providing the device as a bracket for a firestop collar.

6. The device as recited in claim 1 wherein the firestop collar extends a first length, the expander being shorter than the first length, wherein the first length extends circumferentially around a pipe.

7. The device as recited in claim 6 wherein the firestop collar has a first width extending axially in a direction of the pipe, and the expander has a width less than the first width.

8. The device as recited in claim 1 wherein the expander is a flat strip having a first flat side in contact with the anchor and a second flat side for contacting the firestop collar.

9. A device for a firestop collar, the device comprising:
an anchor having lateral edges for anchoring the device to a substrate, the anchor having side tabs extending from the lateral edges to define a shell; and
an expander intended to interact with the firestop collar, the expander being an intumescent material, the expander arranged in the shell between the side tabs.

10. The device as recited in claim 9 wherein the anchor has a first leg and a second leg, the first leg provided to fasten the anchor to the substrate, the second leg having a side contacting the expander.

11. The device as recited in claim 10 wherein the side and the tabs define a U-shaped cross section, the expander fitting within the U-shaped cross-section.

* * * * *